United States Patent

Organek et al.

[11] Patent Number: 5,960,916
[45] Date of Patent: *Oct. 5, 1999

[54] BALL RAMP DRIVELINE CLUTCH ACTUATOR WITH BIASING ELEMENT

[75] Inventors: Gregory J. Organek, Detroit; David M. Preston, Clarkston, both of Mich.

[73] Assignee: Eaton Corporation, Cleveland, Ohio

[*] Notice: This patent is subject to a terminal disclaimer.

[21] Appl. No.: 08/940,844

[22] Filed: Sep. 30, 1997

[51] Int. Cl.⁶ ............................. F16D 13/04; F16D 23/00; F16D 19/00

[52] U.S. Cl. .................. 192/35; 192/93 A; 192/84.7; 192/54.52

[58] Field of Search ..................... 192/35, 93 A, 192/48.2, 84.7, 54.52, 70.23

[56] References Cited

U.S. PATENT DOCUMENTS

| | | |
|---|---|---|
| 1,974,390 | 9/1934 | Eason . |
| 2,861,225 | 11/1958 | Mergen . |
| 2,937,729 | 5/1960 | Sperr, Jr. . |
| 3,000,479 | 9/1961 | Mosbacher . |
| 4,036,328 | 7/1977 | Hoffman et al. .................. 192/93 A X |
| 4,805,486 | 2/1989 | Hagiwara et al. . |
| 5,078,249 | 1/1992 | Botterill . |
| 5,092,825 | 3/1992 | Goscenski . |
| 5,269,730 | 12/1993 | Hirota ............................. 192/84 B X |
| 5,441,137 | 8/1995 | Organek et al. . |
| 5,465,819 | 11/1995 | Weilant et al. ................... 192/93 A X |
| 5,469,948 | 11/1995 | Organek et al. . |
| 5,485,904 | 1/1996 | Organek et al. . |
| 5,505,285 | 4/1996 | Organek et al. . |
| 5,620,072 | 4/1997 | Engle ....................................... 192/35 |

FOREIGN PATENT DOCUMENTS

2667372-A1  4/1992  France ................................. 192/93 A

*Primary Examiner*—Charles A. Marmor
*Assistant Examiner*—Roger Pang
*Attorney, Agent, or Firm*—Loren H. Uthoff, Jr.; Howard D. Gordon

[57] ABSTRACT

A clutch assembly using a ball ramp actuator supplying a clamping force on a clutch disc in response to an electromagnetic field where the clutch clamping force is maintained and increased with clutch slip using a ball ramp mechanism having a control ring and an actuation ring. A bias spring acting to maintain contact between a clutch member and the coil plate of the control clutch. Activated by a control clutch having a response to electrical current introduced into a coil thereby creating an electromagnetic field in a coil pole which attracts a coil plate which in turn applies a cone clutch thereby introducing a rotational torque on the control ring to activate the ball ramp mechanism. The bias spring is used to force the clutch plate toward the coil pole thereby minimizing the air gap between the clutch plate and coil pole thereby providing a more controllable engagement of the clutch assembly.

10 Claims, 4 Drawing Sheets

BALL RAMP DRIVELINE CLUTCH ACTUATOR WITH BIASING ELEMENT

RELATED APPLICATIONS

The present application relates to application U.S. Ser. No. 08/766,838, filed on Dec. 13, 1996 entitled "Driveline Clutch With Unidirectional Apply Ball Ramp" and to application U.S. Ser. No. 08/941,360 and filed on Oct. 30, 1997 entitled "Ball Ramp Clutch Actuator With Unidirectional Apply Using Planetary Gearset" with Attorney Reference No. 97-RTRN-240 both assigned to the same assignee, Eaton Corporation, as this application.

BACKGROUND OF THE INVENTION

1. Field of the Invention

The present invention relates to a vehicle driveline clutch and, more particularly, to a driveline clutch where a friction disc is clamped to an engine flywheel using a ball ramp actuator wherein an electromagnetically actuated cone clutch is used to control the torque transferred to the ball ramp actuator.

2. Description of the Prior Art

Driveline master clutches commonly use a plurality of springs to clamp a friction disc to an engine flywheel. The springs are disposed within a pressure plate assembly which is bolted to the flywheel. A mechanical linkage that controls the pressure plate spring mechanism is displaced by the operator to control the lock-up and release of the driveline clutch.

Efforts to automate the operation of the driveline clutch using electronics are currently underway. It is known to use an electromechanical or hydraulic actuator connected to the mechanical linkage to, in essence, replace the operator for more accurate clutch operation during transmission shifting. Using such an actuator, the mechanical linkage is moved in response to an electrical control signal generated by a central microprocessor used to process a variety of vehicle sensor inputs based on operating conditions to determine when and in what manner the driveline clutch should be activated or deactivated.

The use of a ball ramp actuator to load a clutch pack in a vehicle driveline differential is known. U.S. Pat. Nos. 4,805,486 and 5,092,825, the disclosures of which are hereby incorporated by reference, disclose limited slip differentials where a clutch pack is loaded in response to the activation of a ball ramp actuator initiated by rotation of a servo motor or a solenoid driven brake shoe on an activation ring. The advantage of the ball ramp mechanism over other actuators is that it converts rotary motion into axial motion with very high force amplification, often 100:1 or greater. A ball ramp actuator has also been utilized in a vehicle transmission to engage and disengage gearsets by loading a gear clutch pack in response to a signal as disclosed in U.S. Pat. No. 5,078,249, the disclosure of which is hereby incorporated by reference.

In both of these vehicle applications, one side of the ball ramp actuator, commonly called a control ring, reacts against case ground through the force induced by an electromagnetic field generated by a coil or is rotated by an electric motor relative to case ground. To generate greater clamping forces, the electrical current supplied to the coil or motor is increased thereby increasing the reaction of the control ring to case ground which rotates the control ring relative to an actuation ring thereby causing rolling elements to traverse ramps in the control and actuation ring which increase the axial movement and clamping force on the clutch pack.

It is also known to use a ball ramp actuator to load a vehicle driveline clutch as disclosed in U.S. Pat. Nos. 1,974,390; 2,861,225; 3,000,479; 5,441,137; 5,469,948; 5,485,904 and 5,505,285, the disclosures of which are hereby incorporated by reference. One problem with the use of a ball ramp actuator to supply the vehicle driveline clutch clamping force is that the mechanics of prior art unidirectional ball ramp mechanisms result in a loss of clamping force when the vehicle is in a coast mode. Once the engine power is reduced and the driveline is actually overrunning the engine (coast mode), the prior art ball ramp actuator with single ramp unidirectional actuation will disengage the clutch thereby eliminating engine braking of the vehicle.

A ball ramp actuated clutch using a unidirectional ball ramp having only a single ramp angle, will cause the clutch to disengage when the engine is not supplying rotational energy into the transmission such as when the vehicle is coasting. When coasting, the flywheel is no longer supplying rotational energy to either the transmission or to the ball ramp actuator. In this circumstance, the relative rotation of the actuation ring and control ring has been reversed such that the ball ramp axial displacement is collapsed thereby allowing the pressure plate to pull away from the clutch disc. The result is that the engine is disengaged from the transmission and any engine braking effect is eliminated.

A bidirectional ball ramp actuated clutch is disclosed in U.S. Pat. Nos. 2,937,729 and 5,505,285. Using this more expensive and complicated technology, the ball ramp actuator incorporates bidirectional ramps which provide activation when there is relative rotation between the control ring and the actuation ring in either direction. However, the ball ramp must transition through the nonactivated state which will result in temporary undesirable clutch slippage and, in addition, the components are more expensive to fabricate than a unidirectional unit. Also, a bidirectional ball ramp will have reduced rotational travel between the control ring and the actuation ring in a given package size as compared to a unidirectional ball ramp mechanism. Thus, a unidirectional ball ramp mechanism is preferred if it can be made to activate in both vehicle drive and coast operating modes.

The ball ramp actuator comprises a plurality of rolling elements, a control ring and an opposed actuation ring where the actuation ring and the control ring define at least three opposed single ramp surfaces formed as circumferential semi-circular grooves, each pair of opposed grooves containing one rolling element. A thrust bearing is interposed between the control ring and a housing member, rotating with and connected to the input member such as a flywheel. An electromagnetic coil is disposed adjacent to one element of a control clutch so as to induce a magnetic field that loads the control clutch which in turn applies a force on the control ring of the ball ramp actuator. The control clutch can be similar to those commonly used for vehicle air conditioning compressors, or a cone type control clutch to increase the transmitted actuation force. In an electromagnetic type of clutch, the air gap present in the clutch is traversed by an armature when the coil is energized and the forces on the armature increase in an exponential manner as the armature is drawn toward the stator/coil. The dramatic force increase as the armature is moved results in difficulty in controlling the operation of the ball ramp mechanism and hence the driveline clutch which is loaded by the ball ramp mechanism. Thus, it would be desirable to eliminate or minimize the effect of the air gap in the control clutch for smoother engagement of the driveline clutch especially during vehicle start up.

SUMMARY OF THE INVENTION

The present invention is characterized by a flywheel driven by a prime mover and a transmission input shaft coupled through a ball ramp actuated clutch. The ball ramp mechanism has a plurality of unidirectional variable depth grooves (ramps) and an actuation ring having single direction variable depth grooves at least partially opposed and substantially similar in geometry to those of the control ring. Examples of ball ramp actuator clutch systems are shown in U.S. Pat. Nos. 1,974,390; 2,861,225; 2,937,729; 3,000,479; 5,485,904 and 5,505,285. The actuation ring is prevented from counter rotating upon clutch lock-up in the vehicle coast mode through the use of one-way clutches. Two planetary gearsets (one of which is a partial planetary and functions as a large diameter one-way clutch) are used to allow the ball ramp actuator to increase the clamping force on the clutch friction disc both in drive and coast modes with no reduction in clamping force when transistioning from one mode to the other mode.

A cone clutch is used to transfer rotation from the transmission input shaft to the control ring of the ball ramp mechanism. The cone clutch is engaged upon axial movement of the armature (control clutch plate) toward a coil pole in response to an electrical current in a coil. According to the present invention, a biasing spring is used to apply a minimum continuous force on the armature toward the coil pole. This biasing force moves the armature toward the coil pole thereby minimizing the air gap that must be traversed by the armature prior to significant engagement of the cone clutch.

The electromagnetic coil is used to activate the control clutch which frictionally couples the control ring through one of the planetary gearsets to the transmission input shaft. When energized by the coil, the ball ramp mechanism provides a clamping force on the driveline clutch friction disc where the amplitude of the clamping force immediately increases whenever there exists a rotational speed differential between the flywheel and the transmission input shaft. The amplitude of the clamping force is held at a given level or increased as long as the coil is energized by action of one-way clutches acting on individual planet gears in the two planetary gearsets so that when the vehicle enters a coasting mode (where the engine is braking as opposed to driving the vehicle) the ball ramp actuator remains fully activated. Clutch slippage in the drive mode will cause the ball ramp mechanism to increase the clamping force on the clutch disc. Also, in the coasting mode, if for some reason there is clutch slippage, the planetary gearsets provide for additional relative rotation between the control ring and the actuation ring in the proper direction to increase the clamping force on the clutch friction discs.

One provision of the present invention is to minimize the air gap in the control clutch of a ball ramp mechanism.

Another provision of the present invention is to minimize the air gap in the control clutch of a ball ramp mechanism using a biasing force on the armature of an electromagnetic actuator.

Another provision of the present invention is to minimize the air gap in the control clutch of a ball ramp mechanism using a biasing spring acting between the actuator ring and the armature of an electromagnetic actuator.

DETAILED DESCRIPTION OF THE PREFERRED EMBODIMENT

For purposes of promoting the understanding of the principles of the invention, reference will now be made to the embodiment illustrated in the drawings and specific language will be used to describe the same. It will nevertheless be understood that no limitation on the scope of the invention is thereby intended, such alterations and further modifications in the illustrated device, and such further applications of the principles of the invention as illustrated therein being contemplated as would normally occur to one skilled in the art to which the invention relates.

Certain terminology will be used in the following description for convenience in reference only and will not be limiting. For example, the terms "forward" and "rearward" will refer to directions forward and rearward of the clutch assembly as normally mounted in a vehicle. The terms "rightward" and "leftward" will refer to directions in the drawings in connection with which the terminology is used. The terms "inwardly" and "outwardly" will refer to directions toward and away from respectively, the geometric center of the apparatus. The terms. "upward" and "downward" will refer to directions as taken in the drawings in connection with which the terminology is used. All foregoing terms mentioned above include the normal derivatives and equivalents thereof.

Figure 1:
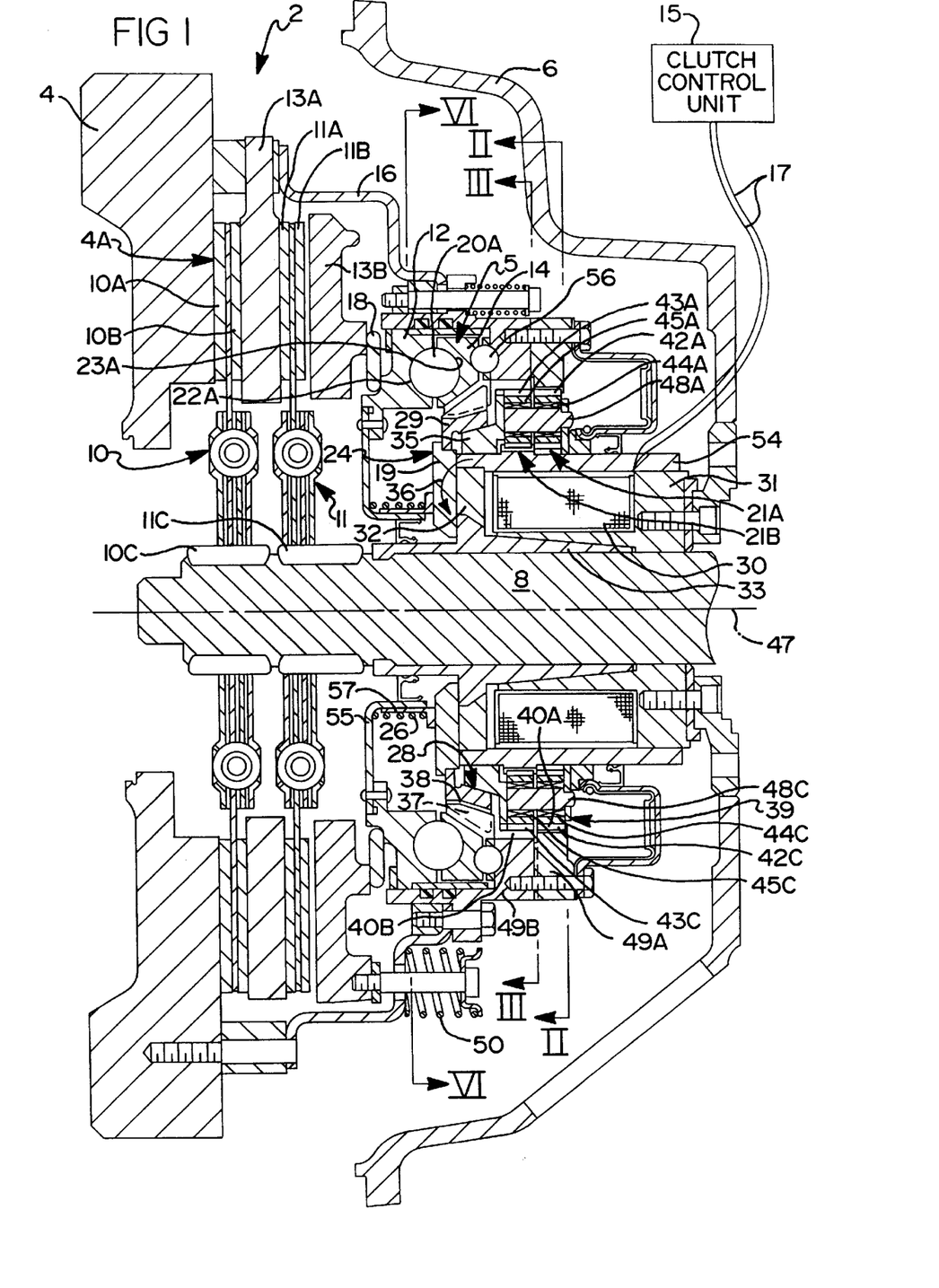
FIG. 1 is a partial cross-sectional view of the ball ramp actuator of the present invention.

Referring now to the drawings, which are not intended to limit the present invention, FIG. 1 is an axial cross-sectional view of a master driveline clutch assembly 2 of the type in which the present invention may be utilized. The main driveline clutch assembly 2 includes a flywheel 4 having a friction surface 4A rotatably driven by a prime mover (not shown) such as an internal combustion engine by its output crankshaft (not shown) which is coupled to a transmission (not shown) by a driveline clutch assembly 2 actuated by a ball ramp mechanism 5. A clutch bellhousing 6 surrounds the driveline clutch assembly 2 and supports the transmission including the transmission input shaft 8 which extends to nonrotatably engage a first clutch disc 10 having friction disc 10A and friction disc 10B through splines 10C at the left end of the transmission input shaft 8 of where the transmission input shaft 8 then extends rightward to drive the transmission gearing. Likewise, a second clutch disc 11 having friction disc 11A and friction disc 11B engages the transmission input shaft 8 through splines 11C. The first clutch disc 10 is clamped between the flywheel 4 and an intermediate pressure plate 13A while the second clutch disc 11 is clamped between the intermediate pressure plate 13A and a primary pressure plate 13B. An actuation ring 12, acts on the Belleville washer 18 to apply an axial force on the primary pressure plate 13B against the second clutch disc 11 and the intermediate pressure plate 13A against the first clutch disc 10 against the flywheel 4 at the flywheel friction surface 4A thereby transferring the rotational power from the prime mover to the transmission through the transmission input shaft 8 and eventually to the rest of the vehicle driveline.

In prior art systems, the clutch pressure plate is forced toward the flywheel using a plurality of loading springs. When the operator wishes to disengage the clutch disc, a mechanical release mechanism is activated by the operator's foot and leg overcoming the force of the springs thereby allowing the clutch disc to slip relative to the flywheel. It should be understood, however, that neither the activation springs nor the mechanical release mechanism are features of the present invention. According to the present invention, a ball ramp mechanism 5 incorporating an activation ring 12 and a control ring 14 separated by at least three rolling elements 20A riding in variable depth ramps or grooves 22A and 23A is used to force the actuation ring 12 toward the flywheel 4 which is controlled by the clutch control unit 15 electronically taking the place of an operator during transmission shifting sequences.

Figure 6:
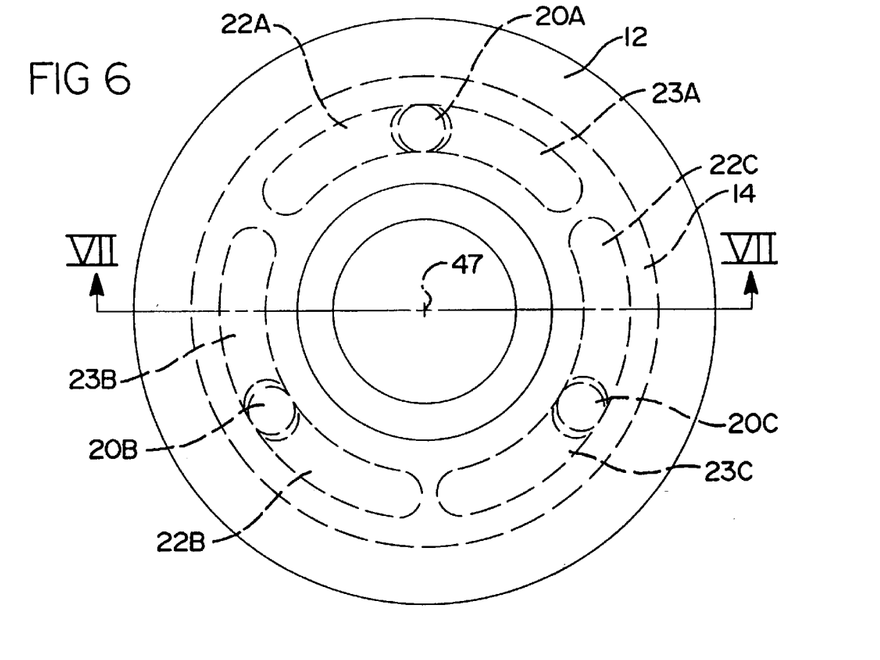
FIG. 6 is an axial cross-sectional view of the ball ramp mechanism of the present invention taken along line VI—VI of FIG. 1.
Figure 7:
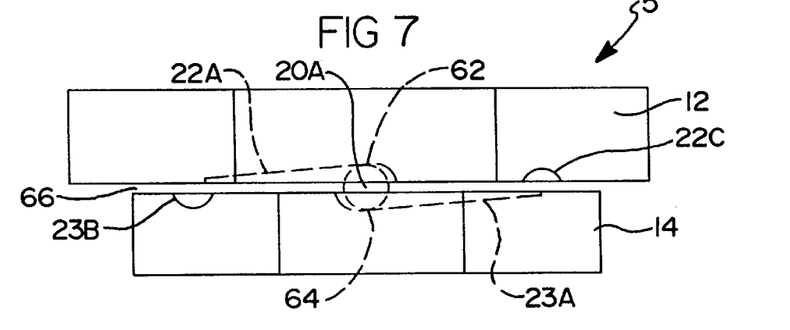
FIG. 7 is a cross-sectional view of the ball ramp mechanism of the present invention taken along line VII—VII of FIG. 6 with the ball ramp mechanism in a nonenergized state.
Figure 8:
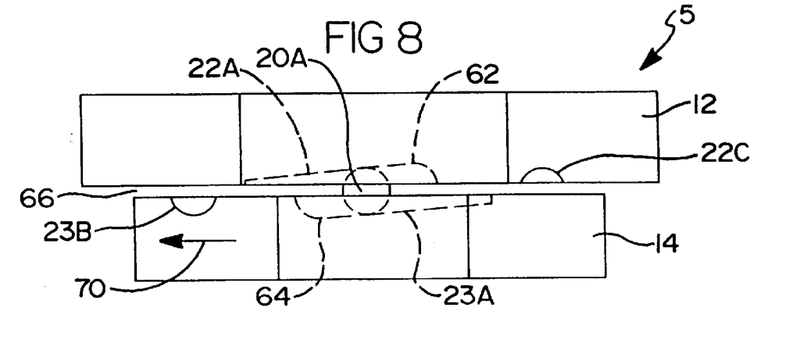
FIG. 8 is a cross-sectional view of the ball ramp mechanism of the present invention taken along line VII—VII of FIG. 6 with the ball ramp mechanism in an energized state.

The clutch bellhousing 6 partially encloses the driveline clutch assembly 2 including the ball ramp mechanism 5 of the present invention. Ball ramp actuators that react the control ring 14 to ground are well known in the art and have been used to load transmission gear clutches as disclosed in U.S. Pat. No. 5,078,249, and differential clutch packs as disclosed in U.S. Pat. No. 5,092,825 where a ball ramp control ring is reacted against case ground by a coil or motor with gearing. In essence, relative rotational motion between the control ring 14 and the actuation ring 12 causes one or more rolling elements 20A, 20B and 20C (see FIG. 6), which can be spherical shaped elements or cylindrical rollers, to be moved along a like number of opposed ramps 22A, 22B and 22C formed in the control ring 14 and ramps 23A, 23B and 23C formed in the actuation ring 12 respectively. Ramps 22A, 22B, 22C, 23A, 23B and 23C have a variable axial depth which is unidirectional. Rotation of the control ring 14 relative to the actuation ring 12 causes the actuation ring 12 to move axially toward the flywheel 4 thereby clamping the first and second clutch discs 10 and 11 between the actuation ring 12 and the flywheel 4. Centering spring 26 tends to restrain rotation of the actuation ring 12 relative to the control ring 14 so that the ball ramp mechanism 5 is not energized by rotational inertial forces which could cause inadvertent engagement of the driveline clutch assembly 2. The actuation ring 12 is nonrotatably connected to the pressure plate housing 16 but can move axially with respect thereto. FIGS. 6–8 illustrate this geometry with more detail and precision, reference to which is made subsequently.

Figure 2:
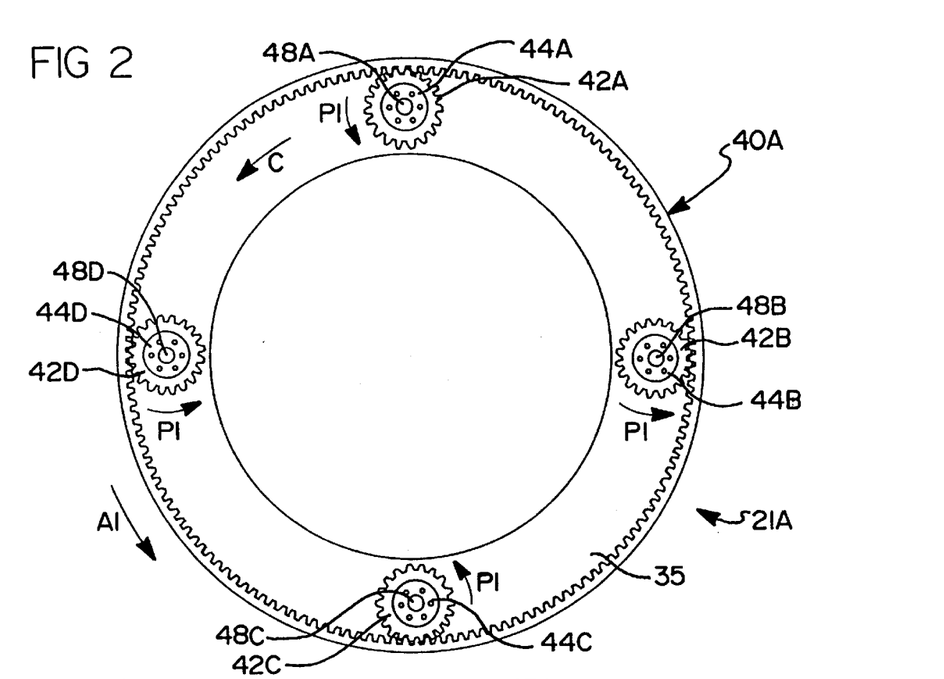
FIG. 2 is a partial cross-sectional view of the first planetary gearset of the present invention taken along line II—II of FIG. 1 with the vehicle driveline in a drive mode.

Thrust bearing 56, which can be any type of suitable bearing, reacts against the second block 49B which is attached to the first block 49A and is used to contain the axial forces generated by the ball ramp rolling elements 20A, 20B and 20C as they engage the ramps 22A, 22B, 22C, 23A, 23B and 23C in the control ring 14 and the actuation ring 12 respectively (see FIG. 2). In general a planetary gearset consists of an annulus, sun gear and at least three gears. The first annulus 40A of the second planetary gearset 21B is attached to the first block 49A which is attached to the flywheel 4 through the pressure plate housing 16. The second annulus 40B is supported by but rotates independently of the second block 49B but is rotationally connected to the clutch ring 35. The sun gear 54 only engages the second gearset 21B and the first gearset 21A does not use a sun gear and functions as a large diameter one-way clutch. The first and second planet gears 42A and 43A are supported on support pin 48A through respective one-way clutches 44A and 45A. Carrier pins 48A, 48B, 48C and 48D are each attached to the carrier ring 39. The other planet gears 42B, 43B, 42C, 43C, 42D and 43D are supported on respective support pins 48B, 48C and 48D through respective one-way clutches 44B, 45B, 44C, 45C, 44D and 45D. When viewed from the cross-section 2-2, the first planet gears 42A are only allowed to rotate counterclockwise while the second planet gears 43A are only allowed to rotate clockwise. Thus, without a sun gear, the first gearset 21A functions as a one-way clutch. The elements of the present invention generally encircle the transmission input shaft 8 and rotate about the axis of rotation 47.

The clutch control unit 15 supplies a controlled electrical current through leads 17 to a coil 30 which activates the clutch coupling 24 which consists of a cone clutch 28, one side of which is the clutch ring 35 which is nonrotatably connected to the annulus 40 of the gearset 21 and the other side is nonrotatably connected to the control ring 14 through the clutch extension 29. Mating channels 37 extend from the control ring 14 and rotationally engage drive flanges 38 extending from the clutch extension 29 which is attached to the control clutch plate 19 which form the clutch coupling 24. In this manner, the cone clutch 28 frictionally couples the control ring 14 to the clutch ring 35 (which is nonrotatably connected to the annulus 40) when the coil 30 is electrically energized by the clutch control unit 15 through leads 17 which electromagnetically attracts the control clutch plate 19 and loads the cone clutch 28. It is desirable to bond friction material to either the control clutch extension member 29 and/or the clutch ring 35 at the cone clutch 28 to provide for the desired torque transfer between these elements when the coil is energized. The clutch extension member 29 uses the drive flanges 38 extending therefrom to rotationally drive one side of the cone clutch 28 without radial and axial alignment problems because of the manner in which the drive flanges 38 engage the drive channels 37. Without this type of clutch coupling 24, the cone clutch 28 would tend to bind due to the production tolerances and wear of the components that make up the clutch coupling 24.

The control ring 14 contains the ramps 22A, 22B and 23C and is frictionally rotatably connected to the clutch ring 35 when the coil 30 is energized by action of the clutch coupling 24. The control clutch member 19 is drawn against the coil pole 32 when the coil 30 is energized by the clutch control unit 15 through connectors 17. The annular electrical coil 30 encircles the transmission input shaft 8 and is supported by the coil support 31 attached to the clutch bellhousing 6. The electrical coil 30 is positioned in close proximity to the coil pole 32 where the coil pole 32 is nonrotatably supported on the transmission input shaft 8 on the splined sleeve 33. Thus, the splined sleeve 33 and the coil pole 32 and the sun gear 54 all rotate with the transmission input shaft 8. The electrical coil 30 is positioned to be partially enclosed by the coil pole 32 and is separated from it by a small air gap. The coil 30 is mounted to the clutch bellhousing 6 and therefore held stationary while the coil pole 32 rotates according to the rotation of the input shaft 8. The coil 30 generates an electromagnetic flux illustrated by arrows 36 in FIG. 1 which travel through the coil pole 32 into the control clutch member 19 and back through the coil pole 32 into the coil 30. This electromagnetic flux creates a force tending to draw the clutch slate 19 into the coil pole 32 thereby creating a frictional force through contact of the clutch extension member 29 on clutch ring 35 and a torque into the gearsets 21A and 21B which apply a resulting torque in the control ring 14 (assuming a rotational speed differential between the flywheel 4 and the transmission input shaft 8). The ball ramp mechanism 5 is activated in the proper manner through the first and second gearsets 21A, 21B which rotate the control ring 14 in a locking direction when the vehicle is in either a coast or drive mode.

When the clutch disc 10 or 11 are unclamped or start to slip due to excessive torque supplied by the prime mover (engine) through the flywheel 4, there is relative rotation between the control ring 14 and the actuation ring 12 thereby forcing the rings 12 and 14 axially further apart (as described in further detail infra) thereby increasing the clamping force of the actuation ring 12 on the clutch discs 10 and 11 at the friction pads 10A, 10B, 11A and 11B between the main pressure plate 13A and the intermediate pressure plate 13A and the flywheel 4. This occurs through a small range of rotational motion of the control ring 14 relative to the actuation ring 12 and provides an automatic, virtually instant, clamping force adjustment should any relative rotation occur between the flywheel 4 and the transmission input shaft 8 by action of the ball ramp mechanism 5.

According to the present invention, once the clutch assembly 2 is locked-up, the coil pole 32 rotates at the same speed as the flywheel 4 and minimal parasitic electrical power is required to be delivered to the coil 30 to maintain lock-up of clutch assembly 2. Using the teaching of the prior art, the control ring 14 can be reacted against a ground surface, such as the clutch bellhousing 6, although continuous slipping would occur between the control ring 14 resulting in high parasitic energy losses and no automatic activation of the ball ramp mechanism 5 upon clutch slip. As illustrated in the present application, by attaching the control ring 14 to the transmission input shaft 8 through the first and second gearsets 21A and 21B controlled by action of one-way clutches 44A, 44C, 45A, 45C, clutch slip will further energize the ball ramp mechanism 5 independent of the operational mode of the vehicle thereby minimizing clutch slip. The reaction time to even minimal slipping of the clutch discs 10 and 11 when in either the vehicle drive or coast mode using the present invention is virtually instantaneous since slippage of the clutch discs 10 and 11 results in the immediate relative motion between the actuation ring 12, and the control ring 14 through the frictionally locked clutch coupling 24 and the first and second gearsets 21A and 21B on the control ring 14 side and through the pressure plate housing 16 to the actuation ring 12 resulting in further activation of the ball ramp mechanism 5. The actuation ring 12 is rotationally coupled to the clutch pressure plate housing 16 which is in turn connected to the flywheel 4 all rotating together.

The bias spring 26 pre-loads the control clutch plate 19 toward the coil pole 32 to minimize air gap effects and functions to control the axial position of the control ring 14 relative to the actuation ring 12 when the electrical coil 30 is not energized such that a linear force is required to progressively energized the ball ramp mechanism 5. Without the biasing spring 26 the clutch plate 19 would be free to separate some distance from the coil pole 32 when the coil 30 is not energized and the clutch assembly 2 was in a nonengaged mode. Then, when the coil 30 was energized, a relatively high current would be required to draw the clutch plate 19 toward the coil plate 33 over the separation distance. As the clutch plate 19 moved toward the coil plate 33 the attraction force would rapidly increase without a change in the current in the coil 30 resulting in a sudden energization of the ball ramp mechanism 5. Without a sophisticated electrical control system the force transferred into the cone clutch 28 would exceed the desired level for a smooth activation of the driveline clutch assembly 2. The biasing spring 26 is shown as a compression spring disposed between the control ring 14 and the actuation ring 12 but could be any type of device that would apply a biasing force on the clutch member 19 to minimize the air gap. Thus, the biasing spring 26 applies a force on the clutch plate 19 such that the clutch plate 19 maintains a minimum separation from the coil pole 32 at all times. This provides for a smooth activation of the ball ramp mechanism 5. It is contemplated that any type of spring means could be utilized to create a biasing force between the clutch member 19 and the coil pole 32. The biasing spring 26 is trapped between housing 55 and retention ring 57 which are free to axially move relative to one another. The housing 55 is attached to the actuation ring 12 where the retention ring 57 contacts the clutch plate 19. The bias spring contacts the housing 55 and the retention ring 57 forcing them apart. The resulting force tends to force the clutch plate 19 towards the coil pole 32 and the clutch extension 29 towards the clutch ring 35. This preloads the clutch coupling 24 so that when the coil 30 is energized, the clutch coupling 24 smoothly engages and activates the ball ramp mechanism 5 in a controlled manner.

A plurality of pressure plate springs 50 act to pull the ball ramp mechanism 5 including the actuation ring 12 away from the clutch friction discs 10 and 11 and the flywheel 4 by acting as spring elements between the pressure plate housing 16 and the actuation ring 12 thereby biasing the actuation ring 12 away from the flywheel 4. The pressure plate housing 16 is attached to the flywheel 4 such that the actuation ring 12 rotates with the flywheel 4 but can move axially relative to the flywheel 4 as controlled by action of the ball ramp mechanism 5 acting to compress the pressure plate springs 50.

Axial forces generated by the ball ramp mechanism 5 are transmitted by the thrust bearing 56 into the second blocks 49B which is attached to the flywheel 4 through the pressure plate housing 16. In the opposite direction, the force generated by the ball ramp mechanism 5 is transmitted to the clutch discs 10 and 11 and the flywheel 4. It should be noted that any number of clutch discs could be utilized including only one clutch disc without the intermediate pressure plate 13A.

Reference is now made to both FIGS. 1 and 2 where FIG. 2 is a partial cross sectional view of the first planetary gearset 21A of the present invention taken along line II—II of FIG. 1. The first and second gearsets 21A and 21B are disposed to rotate the control ring 14 in a direction to further activate the ball ramp mechanism 5. The first gearset 21A (which has no sun gear) is comprised of a plurality of first planet gears 42A, 42B, 42C and 42D supported on respective first one-way clutches 44A, 44B, 44C and 44D each of which are nonrotatably supported on respective carrier pins 48A, 48B, 48C and 48D. Note that with both the first and second gearsets 21A and 21B, any number of planet gears and associated support pins could be utilized. The first planet gears 42A, 42B, 42C and 42D then mesh with the first annulus 40A which is attached to or formed from the first block 49A which rotates with the flywheel 4. The first and second planet gears 42A, 42B, 42C, 42D, 43A, 43B, 43C and 43D are held in axial position by the carrier ring 39. The second gearset 21B is comprised of a sun gear 54 driven by the transmission input shaft 8 meshing with a plurality of second planet gears 42A, 42B, 42C and 42D supported on respective second one-way clutches 45A, 45B, 45C and 45D each of which are nonrotatably supported on respective carrier pins 48A, 48B, 48C and 48D. The second planet gears 43A, 43B, 43C and 43D then mesh with second annulus 40B attached to or formed with second block 49B. The coil pole 32 is rotatably connected on the transmission input shaft 8 along with the sun gear 54.

The first planet gears 42A, 42B, 42C, 42D and the second planet gears 43A, 43B, 43C, 43D are circumferentially spaced from one another by carrier ring 39 mounted on individual one-way clutches on extending carrier pins 48A, 48B, 48C, 48D. The first and second one-way clutches 44A, 44B, 44C, 44D, 45A, 45B, 45C, 45D acting in concert with the other elements of the first and second gearsets 21A and 21B prevent the control ring 14 from rotating relative to the actuation ring 12 in a direction that would deactivate the ball ramp mechanism 5 as long as the coil 30 is energized by preventing rotation of the clutch ring 35 relative to the actuation ring 12 in that direction. Upon energization of the coil 30, the first and second gearsets 21A and 21B operating in conjunction with the first and second one-way clutches 44A, 44B, 44C, 44D, 45A, 45B, 45C, 45D provide for relative rotation of the control ring 14 and the actuation ring 12 only in a direction which results in further activation of the ball ramp mechanism 5 and increased clamping force on the clutch discs 10 and 11 irregardless of the operational mode of the vehicle and torque flow through the driveline.

FIG. 2 is a partial cross sectional view of the clutch assembly 2 of FIG. 1 taken along line II—II showing the relative rotation of the first gearset 21A when the vehicle is in a drive mode. Arrow A1 represents the direction of relative rotation of the first annulus 40A, arrow P1 represents the direction of relative rotation of the first planetary gears 42A, 42B, 42C, 42D and arrow C represents the direction of relative rotation of the carrier ring 39. The annulus 40A is nonrotatably connected to the engine flywheel 4 and the first planet gears 42A, 42B, 42C and 42D are rotatably supported on their respective carrier pins 48A, 48B, 48C and 48D through first one-way clutches 44A, 44B, 44C and 44D where the carrier pins 48A, 48B, 48C and 48D are attached to the carrier ring 39. Assuming the engine is rotating in a counterclockwise direction, the first annulus 40A is rotatably driven by the engine flywheel 4. The first planet gears 42A, 42B, 42C and 42D are rotating counterclockwise on respective first one-way clutches 44A, 44B, 44C and 44D but are prevented from rotating in a clockwise direction. In a vehicle drive condition, as shown in FIG. 2, the elements are rotating or prevented from rotating by one-way clutches as follows: The first annulus 40A is rotating with the engine flywheel 4 in a counterclockwise direction; the first planet gears 42A, 42B, 42C and 42D are rotating on their respective first one-way clutches 44A, 44B, 44C and 44D in a counterclockwise direction where the carrier pins 48A, 48B, 48C and 48D are stationary.

Figure 3:
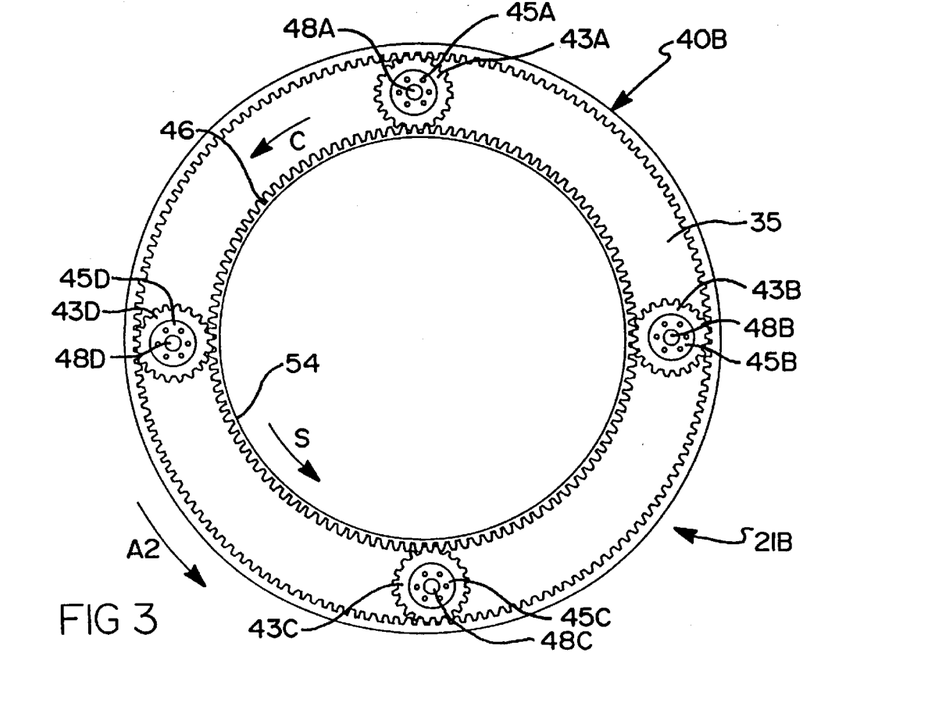
FIG. 3 is a partial cross-sectional view of the second planetary gearset of the present invention taken along line II—II of FIG. 1 with the vehicle driveline in a drive mode.

FIG. 3 is a partial cross sectional view of the clutch assembly of FIG. 1 taken along line Ill—Ill showing the relative rotation of the second gearset 21B when the vehicle is in the drive mode. Arrow S represents the direction of relative rotation of the sun gear 54, arrow $A^2$ represents the direction of relative rotation of the second annulus 40B, arrow $P^2$ represents the direction of relative rotation of the second planetary gears 43A, 43B, 43C, 43D and arrow C represents the direction of relative rotation of the carrier ring 39. The second annulus 40B is nonrotatably connected to the clutch ring 35 which has a friction surface which frictionally couples the clutch ring 35 to the control ring 14 through the clutch extension member 29 when the coil 30 is energized. The second planet gears 43A, 43B, 43C and 43D are rotatably supported by respective carrier pins 48A, 48B, 48C and 48D are attached to the carrier ring 39. The second annulus 40B is nonrotatably connected to the clutch ring 35 which is frictionally coupled to the control ring 14 through the clutch extension member 29 when the coil 30 is energized. The second gearset 21B has a sun gear 54 (unlike the first gearset 21A) which is nonrotatably connected to the transmission input shaft 8. In the drive mode, the second planet gears 43A, 43B, 43C and 43D are nonrotatably supported on respective carrier pins 48A, 48B, 48C and 48D on respective second one-way clutches 45A, 45B, 45C, 45D thereby preventing rotation of the second planet gears 43A, 43B, 43C, 43D in a clockwise direction. The sun gear 54 is shown rotating in a counterclockwise direction driven by the engine and since the second planet gears 43A, 43B, 43C and 43D are locked, the second annulus 40B rotates with the sun gear 54. Thus, any slippage of the friction discs 10A, 10B results in a further activation of the ball ramp mechanism 5 so as to increase the clamping load on the friction discs 10A and 10B even though the torque flow through the vehicle driveline has been reversed in FIG. 3.

Figure 4:
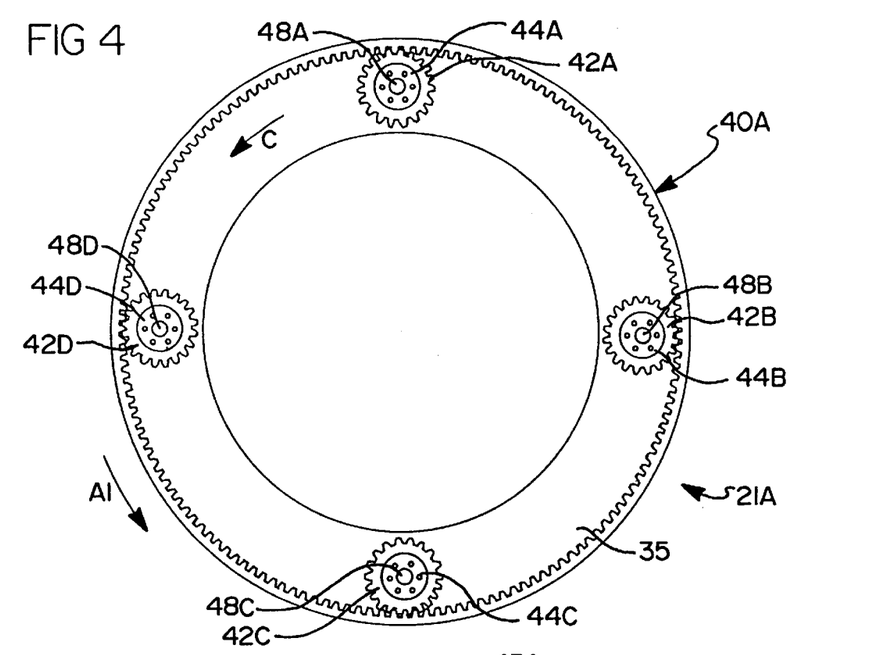
FIG. 4 is a partial cross-sectional view of the first planetary gearset of the present invention taken along line III—III of FIG. 1 with the vehicle driveline in a coast mode.

FIG. 4 is a partial cross sectional view of the clutch assembly of FIG. 1 taken along the first gearset 21A when the vehicle is in a coast mode where the driveline torque flow is reversal from that of the drive mode. Shown is the first annulus 40A rotating in a counterclockwise direction with the engine flywheel 4. The first planet gears 42A, 42B, 42C and 42D are locked from rotating in a counterclockwise direction by respective first oneway clutches 44A, 44B, 44C and 44D and thus, the carrier pins 48A, 48B, 48C and 48D along with the carrier ring 39 are rotated with the engine flywheel 4. Any driveline clutch slip results in relative rotation between the control ring 14 and activation ring 12 which further energizes the ball ramp mechanism 5 and increases the clamping force on the driveline clutch.

Since the first gearset 21A does not have a sun gear, it can be more accurately described as a partial planetary gearset. The first gearset 21A functions as a one-way clutch operating between the flywheel 4 and carrier ring 39. For purposes of this application, the first gearset 21A will be referred to as a planetary even though a sun gear is not utilized and it functions as a one-way clutch and not a traditional planetary gearset.

Figure 5:
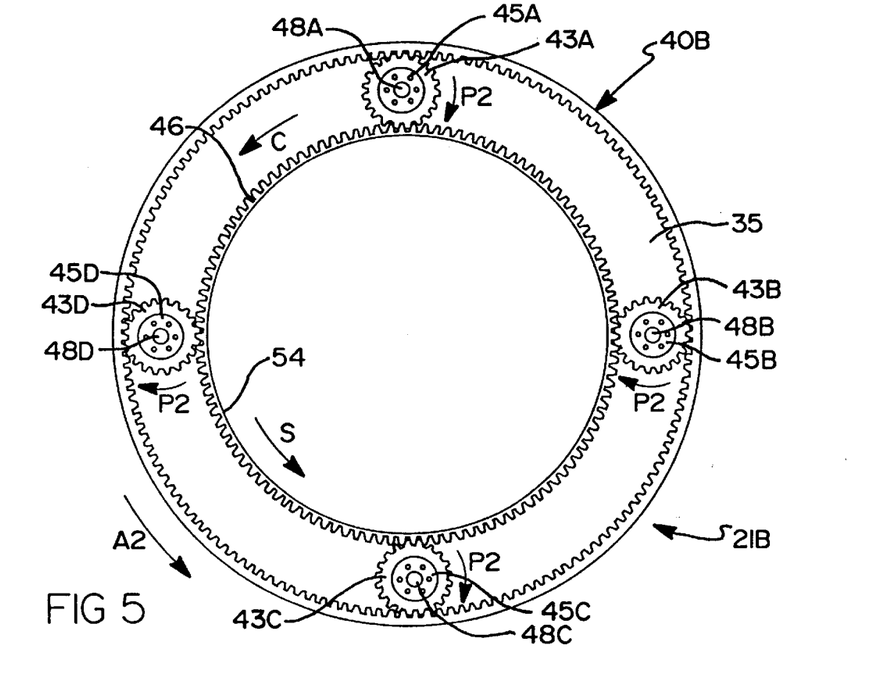
FIG. 5 is a partial cross-sectional view of the second planetary gearset of the present invention taken along line III—III of FIG. 1 with the vehicle driveline in a coast mode.

FIG. 5 is a partial cross sectional view of the driveline clutch assembly 2 of FIG. 1 taken along line III—III showing the relative rotation of the second gearset 21B when the vehicle is in the coast mode. The carrier ring 39 and the attached carrier pins 48A, 48B, 48C and 48D are rotating with the engine flywheel 4 since the second one-way clutches 45A, 45B, 45C and 45D are locked and preventing the second planetary gears 43A, 43B, 43C and 43D from rotating in a counterclockwise direction thereby reversing the input torque and causing the ball ramp mechanism 5 to be further energized when slippage occurs between the flywheel 4 and the friction disc 10A and 10B identical to that produced as the result shown in FIG. 3.

Referring now to FIGS. 6, 7 and 8 to describe the operation of the ball ramp mechanism 5, a cross-sectional view of the ball ramp mechanism 5 is shown in FIG. 6 and views taken along line VII—VII of the actuation ring 12 and the control ring 14 separated by a spherical element 20A are shown in FIGS. 7 and 8. Three spherical rolling elements 20A, 20B and 20C are spaced approximately 120° apart rolling in three ramps 22A, 22B and 22C having a variable axial depth respectively as the control ring 14 is rotated relative to the actuation ring 12. Any number of spherical rolling elements 20A, 20B and 20C and respective ramps 22A, 22B, 22C, 23A, 23B and 23C could be utilized depending on the desired rotation and axial motion of the ball ramp mechanism 5. It is mandatory to employ at least three spherical rolling elements 20A, 20B and 20C traveling on a like number of identical equally spaced opposed ramps 22A, 22B, 22C, 23A, 23B and 23C formed respectively in both the control ring 14 and the actuation ring 12 to provide axial and radial stability to the control ring 14 and the actuation ring 12. As mentioned previously, any type of rolling elements could be utilized such as a ball or a cylindrical roller. The actuation ring 12 is shown which rotates with the flywheel 4, the pressure plate housing 16 and the first and second blocks 49A, 49B turning about axis of rotation 47 coincident with the axis of rotation of the transmission input shaft 8.

Three semi-circular, circumferential ramps 23A, 23B and 23C are shown formed in the face of the actuation ring 12 with corresponding identical opposed ramps 22A, 22B and 22C formed in the face of the control ring 14. The control ring 14 and the actuation ring 12 are made of a high strength steel and the unidirectional tapered ramps 22A, 22B, 22C, 23A, 23B and 23C carburized and hardened to $R_C55$–60. The ramps 22A, 22B, 22C, 23A, 23B and 23C are tapered in depth as more clearly shown in FIG. 7 by references to ramps 22A and 23A and circumferentially extend for approximately 120° (actually less than 120° to allow for a separation section between the ramps). The separation 66 between the control ring 14 and the actuation ring 12 is determined by the rotational orientation between the two corresponding opposed ramps such as 22A and 23A where the spherical rolling element 20A rolls on both ramps 22A and 23A as the control ring 14 is rotated relative to the actuation ring 12 on the same axis of rotation. In a substantially identical manner, rolling element 20B rolls on both ramps 22B and 23B and rolling element 20C rolls on both ramps 22C and 23C. The relative rotation forces the two rings 14, 12 axially apart or allows them to come closer together as determined by the position of the rolling elements 20A, 20B and 20C or their respective ramp pairs 22A, 23A and 22B, 23B and 22C, 23C thereby providing an axial movement for clamping and releasing the clutch disc 10 between the actuation ring 12 and the flywheel 4.

FIG. 7 illustrates the rotational orientation of the control ring 14 and the actuation ring 12 when the carrier ring 48 is at a minimum when the ramps 22A and 23A are at one extreme in alignment and the spherical element 20A is in the deepest section of the ramps 22A and 23A. Assuming there is a rotational speed difference the flywheel 4 and the transmission input shaft 8, upon energizing the coil 30, the control ring 14 is rotated relative to the actuation ring 12 by application of a rotational torque input through the clutch coupling 24 and the ramps 22A and 23A move relative to one another causing the spherical element 20A to roll on each of the ramp surfaces 22A and 23A moving to a different position on both ramps 22A and 23A thereby forcing the control ring 14 and the actuation ring 12 apart to a wider separation 66 as shown in FIG. 8. A similar separation force is generated by rolling element 20B rolling on ramp surfaces 22B and 23B and by rolling element 20C rolling on ramp surfaces 22C and 23C. The rotation of the control ring 14 is clearly illustrated by reference to FIGS. 7 and 8 by the relative shift in position of reference points 62 and 64 from directly opposed in FIG. 7 to an offset position in FIG. 8 caused by rotation of the control ring 14 in the direction of the arrow 70. This increase in axial displacement can be used for a variety of applications, and especially driveline clutches, since the force level relative to the torque applied to the control ring 14 is quite high, typically a ratio of 100:1. This can be used as illustrated in this application to load an actuation ring 12 against clutch discs 10 and 11 and flywheel 4 in a vehicle driveline. Additional illustrative details of operation of a ball ramp actuator can be found by reference to U.S. Pat. No. 4,805,486.

If the flywheel 4 is rotating at the same speed as the transmission input shaft 8, even if the coil 30 is energized, the control ring 14 rotates at the same speed as the actuation ring 12 and no additional axial force is generated by the ball ramp mechanism 5 since there is no relative rotation between the control ring 14 and the actuation ring 12. Assuming the coil 30 remains energized thereby electromagnetically tying the control ring 14 to the transmission input shaft 8 through the clutch coupling 24, coil pole 32 and the first and second gearsets 21A and 21B, according to the present invention, any relative rotation between the flywheel 4 and the transmission input shaft 8, results in relative rotation between the control ring 14 and the actuation ring 12 in a direction which causes the spherical elements 20A, 20B and 20C to further increase the separation 66 between the control ring 14 and the actuation ring 12 thereby generating additional clamping force by the actuation ring 12 so as to use the power of the flywheel to increase the lock-up force on the clutch disc 10.

According to the present invention, the vehicle driveline clutch actuator can be used to couple a rotating input shaft to an output shaft where the input shaft would be analogous to the flywheel 4 and the output shaft would be analogous to the transmission input shaft 8 as shown in FIG. 1. The present invention would prevent the ball ramp mechanism 5 from retracting and disengaging the clutch discs 10 and 11 so long as the coil 30 was energized thereby providing a friction coupling between the input shaft (flywheel) and the output shaft (transmission input shaft) irregardless of the direction of the torque transfer.

This invention has been described in great detail, sufficient to enable one skilled in the art to make and use the same. Various alterations and modifications of the invention will occur to those skilled in the art upon a reading and understanding of the foregoing specification, and it is intended to include all such alterations and modifications as part of the invention, insofar as they come within the scope of the appended claims.

We claim:

1. A ball ramp actuator for rotationally coupling two rotating elements comprising:

an input element driven by a prime mover and rotating about an axis of rotation;

an output element having an axis of rotation coaxial with said axis of rotation of said input element for rotating an output device;

a ball ramp mechanism for generating an axial movement comprising; an annular control ring having an axis of rotation, said control ring having a plurality of circumferential control ramps formed in a first face of said control ring, said control ramps varying in axial depth, an equivalent number of rolling elements one occupying each of said control ramps, an actuation ring having an axis of rotation coaxial with said axis of rotation of said control ring, said actuation ring having a plurality of actuation ramps substantially identical in number, shape and radial position to said control ramps where said actuation ramps at least partially oppose said control ramps and where each of said rolling elements is contained between one of said actuation ramps and a respective control ramp, said control ring being axially and rotationally moveably disposed relative to said actuation ring;

a carrier ring frictionally rotationally coupled to said control ring;

a first gearset having an annulus nonrotatably connected to said input element where a plurality of first planet gears engage said annulus;

a second gearset having an annulus electromagnetically coupled to said control ring, and a sun gear rotatably driven by said output element where a plurality of second planet gears couple said sun gear to said annulus;

a control clutch for frictionally coupling said control ring to said input element;

a coil for inducing an electromagnetic field in said control clutch to frictionally couple said carrier ring to said control ring;

a coil plate disposed adjacent to said coil and rotating with said output element;

a clutch member nonrotatably connected to said control ring contacting said coil plate; and a biasing means for maintaining a minimum separation between said clutch member and said coil plate when said coil is not energized.

2. The ball ramp actuator of claim 1, wherein said rolling elements are spherical.

3. The ball ramp actuator of claim 1, wherein said control ramps and said actuation ramps have a continuously increasing axial depth.

4. The ball ramp actuator of claim 1, wherein said coil is disposed adjacent to said control ring.

5. The ball ramp actuator of claim 4, wherein said coil encircles said output element.

6. The ball ramp actuator of claim 5, further comprising a control unit electrically connected to said coil for supplying electrical energy to said coil.

7. The ball ramp actuator of claim 1, wherein said control clutch is connected to a control clutch extension which is substantially nonrotatably connected to said control ring where said control clutch extension frictionally engages said carrier ring when said coil is energized.

8. The ball ramp actuator of claim 1, wherein said input element is a flywheel and wherein said output element is a transmission input shaft and where said output device is a transmission.

9. The ball ramp actuator of claim 1, wherein said biasing means is a coil spring.

10. A ball ramp clutch assembly for rotationally coupling two rotating elements comprising:

an input element driven by a prime mover and rotating about an axis of rotation;

an output element rotationally coupled to said input element using said ball ramp clutch assembly;

a ball ramp mechanism for generating an axial movement comprising; an annular control ring having an axis of rotation, said control ring having a plurality of circumferential control ramps formed in a first face of said control ring, said control ramps varying in axial depth, an equivalent number of rolling elements one occupying each of said control ramps, an actuation ring having an axis of rotation coaxial with said axis of rotation of said control ring, said actuation ring having a plurality of actuation ramps substantially identical in number, shape and radial position to said control ramps where said actuation ramps at least partially oppose said control ramps and where each of said rolling elements is contained between one of said actuation ramps and a respective control ramp, said control ring being axially and mtationally moveably disposed relative to said actuation ring;

a coil for creation of an electromagnetic field in a coil pole upon introduction of an electrical current in said coil;

a control clutch having a clutch plate positioned adjacent to said coil pole disposed to apply a rotational torque to said control ring through a cone clutch to activate said ball ramp mechanism upon creation of an electromagnetic field by said coil; and biasing means for creating a force on said clutch plate tending to move said clutch plate toward said coil pole.

* * * * *